US008367750B2

(12) United States Patent
Moribe et al.

(10) Patent No.: US 8,367,750 B2
(45) Date of Patent: *Feb. 5, 2013

(54) AQUEOUS INK, INK JET RECORDING METHOD, INK CARTRIDGE, RECORDING UNIT AND INK JET RECORDING APPARATUS

(75) Inventors: Kenji Moribe, Fujisawa (JP); Shinichi Hakamada, Kawasaki (JP); Takashi Imai, Kawasaki (JP); Masako Udagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 570 days.

This patent is subject to a terminal disclaimer.

(21) Appl. No.: 11/550,486

(22) Filed: Oct. 18, 2006

(65) Prior Publication Data

US 2007/0112095 A1    May 17, 2007

(30) Foreign Application Priority Data

Oct. 28, 2005    (JP) .................................. 2005-314708

(51) Int. Cl.
  *C09D 11/00*    (2006.01)
(52) U.S. Cl. ........................................ 523/160; 523/161
(58) Field of Classification Search .................. 523/160, 523/161
  See application file for complete search history.

(56) References Cited

U.S. PATENT DOCUMENTS

| 5,085,698 | A | * | 2/1992 | Ma et al. ........................ 524/388 |
| 5,221,334 | A | | 6/1993 | Ma et al. ...................... 106/20 D |
| 5,272,201 | A | | 12/1993 | Ma et al. ........................ 524/505 |
| 5,324,349 | A | * | 6/1994 | Sano et al. .................. 106/31.25 |
| 5,439,514 | A | * | 8/1995 | Kashiwazaki et al. ..... 106/31.65 |
| 5,514,208 | A | * | 5/1996 | Nagai et al. ................ 106/31.43 |
| 5,519,085 | A | * | 5/1996 | Ma et al. ........................ 524/503 |
| 5,736,998 | A | * | 4/1998 | Caren et al. ...................... 347/45 |
| 5,782,967 | A | | 7/1998 | Shirota et al. .............. 106/31.58 |
| 6,214,963 | B1 | | 4/2001 | Noguchi et al. ................. 528/71 |
| 6,234,601 | B1 | * | 5/2001 | Hayashi et al. ................. 347/16 |
| 6,398,355 | B1 | | 6/2002 | Shirota et al. ................. 347/100 |
| 6,398,357 | B1 | * | 6/2002 | Holloway et al. ............. 347/100 |
| 6,474,803 | B1 | | 11/2002 | Shirota et al. ................. 347/100 |
| 6,552,156 | B2 | | 4/2003 | Noguchi et al. ................. 528/71 |
| 6,698,876 | B2 | | 3/2004 | Sato et al. ..................... 347/100 |

(Continued)

FOREIGN PATENT DOCUMENTS

| EP | 1 153 992 A1 | 11/2001 |
| EP | 1 291 397 A1 | 3/2003 |

(Continued)

OTHER PUBLICATIONS

Dec. 28, 2006 European Search Report in European Appln. No. 06 12 2411.

*Primary Examiner* — Doris Lee
(74) *Attorney, Agent, or Firm* — Fitzpatrick, Cella, Harper & Scinto

(57) ABSTRACT

The invention provides an aqueous ink comprising a polymer having hydroxyl groups and a pigment, which can provide images excellent in scratch resistance and highlighter resistance and can inhibit the seeping out phenomenon of the polymer and the deterioration of ejection characteristics even when it is stored for a long period of time. The aqueous ink comprises a polymer having hydroxyl groups, a pigment and a water-soluble organic solvent, wherein the water-soluble organic solvent comprises a polyhydric alcohol having a value of number of hydroxyl groups/number of carbon atoms in its molecule of 0.50 or less.

23 Claims, 5 Drawing Sheets

U.S. PATENT DOCUMENTS

| | | | |
|---|---|---|---|
| 6,737,449 B1 * | 5/2004 | Yatake | 523/160 |
| 6,929,362 B2 | 8/2005 | Takada et al. | 347/100 |
| 6,932,465 B2 | 8/2005 | Nito et al. | 347/96 |
| 6,935,732 B2 | 8/2005 | Takada et al. | 347/96 |
| 7,125,111 B2 | 10/2006 | Udagawa et al. | 347/100 |
| 7,141,105 B2 | 11/2006 | Udagawa et al. | 106/31.49 |
| 7,185,978 B2 | 3/2007 | Nagashima et al. | 347/100 |
| 2002/0130936 A1 * | 9/2002 | Sano et al. | 347/100 |
| 2003/0097960 A1 * | 5/2003 | Ito et al. | 106/31.58 |
| 2003/0236321 A1 | 12/2003 | Sano et al. | 523/160 |
| 2004/0102541 A1 | 5/2004 | Sacoto et al. | 523/160 |
| 2005/0088501 A1 | 4/2005 | Nagashima et al. | 347/100 |
| 2005/0124726 A1 * | 6/2005 | Yatake et al. | 523/160 |
| 2005/0204955 A1 | 9/2005 | Nagashima et al. | 106/31.59 |
| 2005/0219341 A1 | 10/2005 | Nito et al. | 347/100 |
| 2006/0007288 A1 | 1/2006 | Takada et al. | 347/100 |
| 2006/0007289 A1 | 1/2006 | Nito et al. | 347/100 |
| 2006/0012657 A1 | 1/2006 | Nagashima et al. | 347/100 |
| 2006/0021545 A1 | 2/2006 | Nagashima et al. | 106/31.27 |
| 2006/0089423 A1 * | 4/2006 | Ueno et al. | 523/160 |
| 2006/0098067 A1 | 5/2006 | Imai et al. | 347/100 |
| 2006/0098068 A1 | 5/2006 | Hakamada et al. | 347/100 |
| 2006/0100311 A1 | 5/2006 | Tokuda et al. | 523/160 |
| 2006/0103704 A1 | 5/2006 | Hakamada et al. | 347/100 |
| 2006/0125895 A1 | 6/2006 | Nito et al. | 347/100 |
| 2006/0192827 A1 | 8/2006 | Takada et al. | 347/100 |
| 2006/0196389 A1 | 9/2006 | Tsuji et al. | 106/31.43 |
| 2007/0034114 A1 | 2/2007 | Udagawa et al. | 106/31.15 |
| 2007/0097155 A1 | 5/2007 | Imai et al. | 347/1 |
| 2007/0097156 A1 | 5/2007 | Udagawa et al. | 347/1 |
| 2007/0191508 A1 | 8/2007 | Nakagawa et al. | 523/160 |
| 2007/0252881 A1 | 11/2007 | Sanada et al. | 347/100 |

FOREIGN PATENT DOCUMENTS

| | | |
|---|---|---|
| EP | 1 295 916 A1 | 3/2003 |
| EP | 1 609 807 A1 | 12/2005 |
| JP | 5-179183 | 7/1993 |
| JP | 2005-23102 A | 1/2005 |
| WO | WO 2004/090006 * | 10/2004 |
| WO | WO 2004/090006 A1 | 10/2004 |

* cited by examiner

AQUEOUS INK, INK JET RECORDING METHOD, INK CARTRIDGE, RECORDING UNIT AND INK JET RECORDING APPARATUS

BACKGROUND OF THE INVENTION

1. Field of the Invention

The present invention relates to an aqueous ink comprising a polymer and a pigment.

2. Description of the Related Art

It has been known to use a pigment as a coloring material of an ink in order to make excellent the fastness properties, such as light fastness, gas fastness and water fastness, of an image obtained by an ink jet recording method. It has also been known to use in an ink a resin dispersion pigment that is dispersed with a polymer as a dispersant, or a self-dispersible pigment to the surface of which an hydrophilic group is bonded and a water-soluble polymer in order to improve the scratch resistance and highlighter resistance of an image (Japanese Patent Application Laid-Open No. H5-179183).

SUMMARY OF THE INVENTION

The present inventors have carried out a detailed investigation as to inks comprising a resin dispersion pigment with a view toward improving the fastness properties, such as light fastness, gas fastness and water fastness, of an image obtained by an ink jet recording method as well as the scratch resistance and highlighter resistance thereof. As a result, it has been found that the ejection characteristics of the inks are greatly affected by the type or properties of a polymer functioning as a dispersant.

Thus, the present inventors have carried out a further detailed investigation as to polymers used as dispersants for the purpose of making excellent the fastness properties, scratch resistance and highlighter resistance of images as well as the ejection characteristics of inks. As a result, it has been found that an ink in which a pigment is dispersed with a polymer having hydroxyl groups can solve the above-described problems.

However, it has been found that when an ink cartridge having stored therein an ink in which a pigment is dispersed with a polymer having hydroxyl groups is installed in an ink jet recording apparatus and then is left to stand for a long period of time without ejecting the ink, the following new technical problem is raised. Namely, it has been found that the polymer in the ink seeps out through ejection orifices of a recording head, adheres in the vicinity of the ejection orifices and then sticks there, and thereby the ejection characteristics are deteriorated.

Accordingly, it is an object of the present invention to provide an aqueous ink (hereinafter may also be referred to as "ink") capable of solving the following problems when the aqueous ink comprising a resin dispersion pigment that is dispersed with a polymer having hydroxyl groups as a dispersant. In other words, the object is to provide an aqueous ink that can provide images excellent in scratch resistance and highlighter resistance and can inhibit the seeping out phenomenon of the polymer and the deterioration of ejection characteristics even when it is stored for a long period of time.

Another object of the present invention is to provide an ink cartridge, a recording unit and an ink jet recording method using the above-described aqueous ink.

The above objects can be achieved by the present invention described below. More specifically, an aqueous ink according to the present invention comprises a polymer having hydroxyl groups, a pigment and a water-soluble organic solvent, wherein the water-soluble organic solvent comprises a polyhydric alcohol having a value of number of hydroxyl groups/number of carbon atoms in its molecule of 0.50 or less.

The ink jet recording method according to another embodiment of the present invention is an ink jet recording method comprising ejecting an ink by an ink jet method to conduct recording on a recording medium, wherein the ink is the aqueous ink of the above-described constitution.

The ink cartridge according to a further embodiment of the present invention is an ink cartridge comprising an ink storage portion storing an ink, wherein the ink is the aqueous ink of the above-described constitution.

The recording unit according to a still further embodiment of the present invention is a recording unit comprising an ink storage portion storing an ink and a recording head for ejecting the ink, wherein the ink is the aqueous ink of the above-described constitution.

The ink jet recording apparatus according to a yet still further embodiment of the present invention is an ink jet recording apparatus comprising an ink storage portion storing an ink and a recording head for ejecting the ink, wherein the ink is the aqueous ink of the above-described constitution.

According to the present invention, there can be provided an aqueous ink capable of solving the following problems when using the aqueous ink comprising a resin dispersion pigment that is dispersed with a polymer having hydroxyl groups as a dispersant. In other words, there can be provided an aqueous ink that can provide images excellent in scratch resistance and highlighter resistance and can inhibit the seeping out phenomenon of the polymer and the deterioration of ejection characteristics even when it is stored for a long period of time.

According to another embodiment of the present invention, there can be provided an ink cartridge, a recording unit and an ink jet recording method using the above-described aqueous ink.

Further features of the present invention will become apparent from the following description of exemplary embodiments with reference to the attached drawings.

DESCRIPTION OF THE EMBODIMENTS

The present invention will hereinafter be described in more detail by the best mode for carrying out the invention.

The present inventors have carried out a detailed investigation as to inks comprising a resin dispersion pigment with a view toward improving the scratch resistance and highlighter resistance of images obtained by an ink jet recording method. The inventors have supposed that the ejection characteristics can be improved by enhancing the hydrophilicity of a pigment, and thus carried out an investigation as to the use of a polymer having hydroxyl groups as a dispersant for the resin dispersion pigment further. However, it has been found that when an ink cartridge having stored therein an ink containing a resin dispersion pigment dispersed with a polymer having hydroxyl groups is installed in an ink jet recording apparatus and then is left to stand for a long period of time without ejecting the ink, the following problem is raised. In other words, it has been confirmed that a phenomenon that the polymer in the ink seeps out through ejection orifices of a recording head occurs. Thus, the present inventors have carried out an investigation as to causes of the above phenomenon. As a result, the inventors have concluded that the following phenomenon caused within a nozzle of the recording head is one of the causes. The mechanism with which the polymer seeps out will hereinafter be described in detail with reference to FIGS. 1A, 1B and 1C.

Figure 1A:
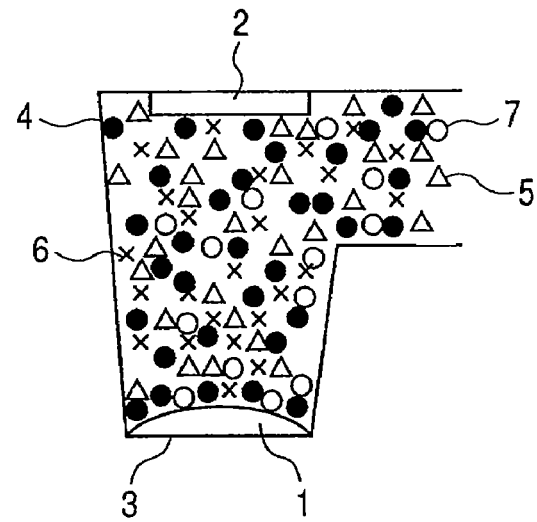
FIGS. 1A, 1B and 1C typically illustrate the condition that the state of an ink changes with time within a nozzle.
Figure 1B:
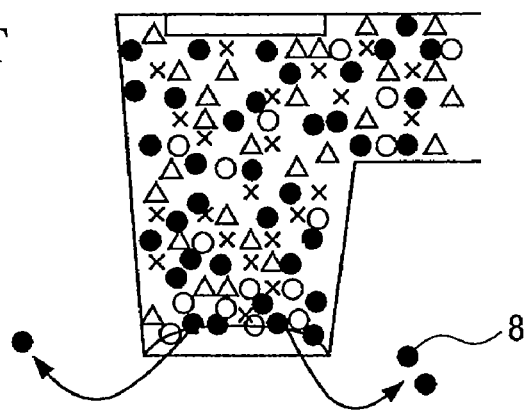
Figure 1C:
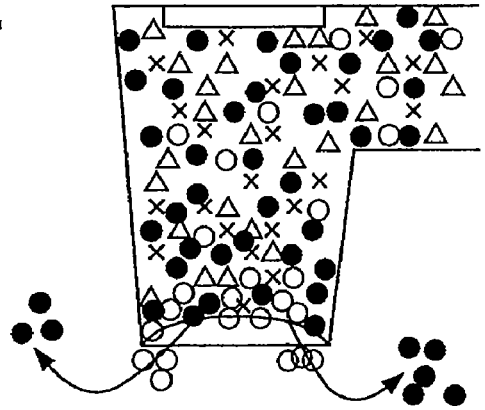

FIGS. 1A, 1B and 1C typically illustrate the condition that the state of an ink containing a resin dispersion pigment dispersed by a polymer having hydroxyl groups changes with time within a nozzle.

FIG. 1A illustrates a state after the ink has been ejected from an ejection orifice 1 by thermal energy applied from a heater 2. As illustrated in FIG. 1A, water molecule 4, pigment particle 5 on which the polymer has been adsorbed, a water-soluble organic solvent 6, and a polymer having hydroxyl groups that is not adsorbed on the pigment (a free polymer 7 having hydroxyl groups) are present within the nozzle in a uniformly dispersed state. Incidentally, in the present invention, a polymer that is not adsorbed on the pigment is referred to as "free polymer", and a polymer having hydroxyl groups in a state not adsorbed on a pigment is referred to as "free polymer having hydroxyl groups".

FIG. 1B illustrates a state after having been left to stand for a certain period of time with the state of FIG. 1A. As illustrated in FIG. 1B, water first evaporates from the ejection orifice 1 within the nozzle with time (water molecules 8 evaporated). When the time has further elapsed, the water molecule 4 within the nozzle transfers in the direction of the ejection orifice 1. At this time, the free polymer 7 having hydroxyl groups, which is forming a hydrogen bond with the water molecule 4, also transfers together with the water molecule 4 in the direction of the ejection orifice 1.

FIG. 1C illustrates a state after the time has still further elapsed. As illustrated in FIG. 1C, the free polymer 7 having hydroxyl groups, which is forming a hydrogen bond with the water molecule 4, seeps out through the ejection orifice 1 and adheres to an orifice face 3 centering on the ejection orifice 1. The free polymer 7 having hydroxyl groups right after having adhered to the orifice face 3 keeps a dissolved state by the bonded water molecule 4. Since the bonded water molecule 4 evaporates with time, however, the free polymer 7 having hydroxyl groups loses its solubility to stick as a deposit on the periphery of the ejection orifice 1.

The phenomenon that the polymer in the ink seeps out through the ejection orifice of the recording head occurs according to the above-described mechanism. As a result, it is considered that the ejection characteristics are deteriorated by the presence of the deposit.

Incidentally, whether or not all the free polymer having hydroxyl groups present in the ink according to the present invention forms the hydrogen bond with the water molecules is unknown. It is, however, inferred that majority of the polymer having hydroxyl groups is present in the state of forming a hydrogen bond with the water molecule in order to more stably be present in the ink.

As described above, the polymer to cause seeping out is a polymer having hydroxyl groups that is not adsorbed on the pigment, i.e., a free polymer having hydroxyl groups. As a consequence, it is supposed that the deterioration of the ejection characteristics can be inhibited by reducing the content of the free polymer having hydroxyl groups in the ink.

Accordingly, it is supposed that the above-described phenomenon can be inhibited by taking the following inventive arrangement within such a range that the ejection characteristics are not deteriorated and the scratch resistance and highlighter resistance are sufficiently achieved. More specifically, it is supposed that the content of the free polymer having hydroxyl groups in the ink is reduced to the utmost, or the hydrophobicity of a monomer constituting a dispersant is made higher, whereby adsorbability between the pigment and the dispersant is enhanced to prevent the generation of the free polymer having hydroxyl groups to the utmost. However, it is very difficult to actually perform such an arrangement as described above. Thus, the present inventors have carried out an investigation as to means for arranging the above-described phenomenon by devising the formulation of an ink.

As a result, it has been found that a polyhydric alcohol contained in an ink as a water-soluble organic solvent can inhibit the phenomenon that the free polymer having hydroxyl groups seeps out through the ejection orifice. The reason why the phenomenon that the free polymer having hydroxyl groups seeps out through the ejection orifice can be inhibited is not clearly known. However, the present inventors speculate as described below.

Figure 2A:
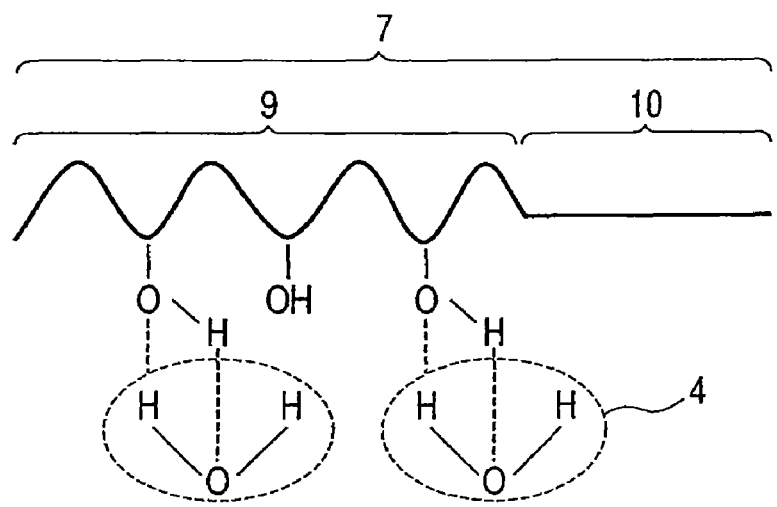
FIGS. 2A and 2B typically illustrate the relation among a free polymer having hydroxyl groups, a water molecule and a polyhydric alcohol.
Figure 2B:
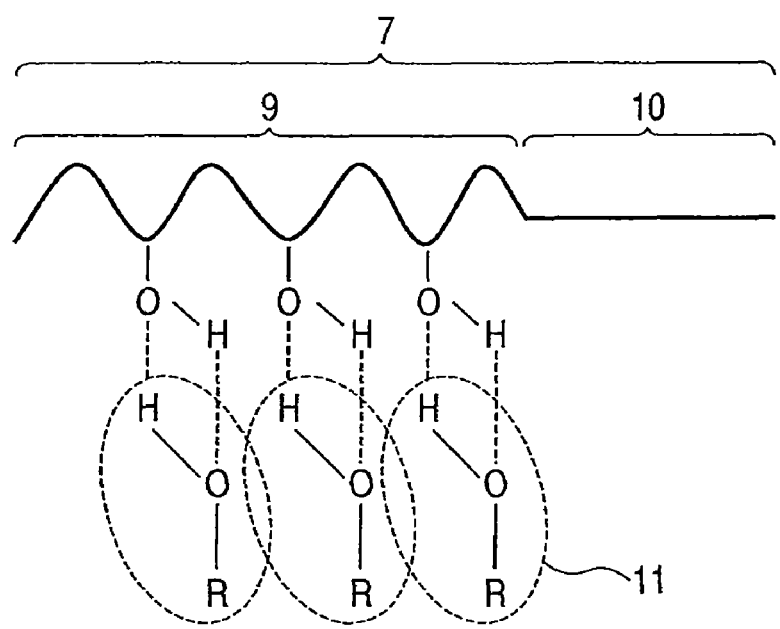

FIGS. 2A and 2B typically illustrate the relation among a free polymer having hydroxyl groups, a water molecule and a polyhydric alcohol in an ink containing a resin dispersion pigment dispersed with a polymer having hydroxyl groups.

FIG. 2A illustrates a state that a free polymer 7 having hydroxyl groups has formed a hydrogen bond with a water molecule 4 in the case where the ink contains no polyhydric alcohol. The free polymer 7 having hydroxyl groups is composed of a segment 9 having hydroxyl groups and a segment 10 having no hydroxyl group. Incidentally, "segment" is defined as a repeating unit which constitutes the polymer. FIG. 2B illustrates states of the free polymer 7 having hydroxyl groups and a polyhydric alcohol 11 in the case where an ink contains the polyhydric alcohol.

As apparent from FIG. 2B, the free polymer 7 having hydroxyl groups, whose hydrophobicity is relatively high compared with the water molecule 4, tends to be present in the vicinity of the polyhydric alcohol 11, whose hydrophobicity is relatively high compared with the water molecule 4. As a result, the free polymer 7 having hydroxyl groups form a hydrogen bond selectively with the polyhydric alcohol 11, not with the water molecule 4. The free polymer 7 having hydroxyl groups, which does not form a hydrogen bond with the water molecule 4, does not cause such transfer to the ejection orifice attending on the evaporation of the water molecule as shown in FIGS. 1B and 1C. As a result, it is supposed that the phenomenon that the free polymer having hydroxyl groups seeps out through the ejection orifice can be inhibited.

The present inventors have further carried out an investigation as to various polyhydric alcohols on the basis of the mechanism described above. As a result, it has been found that it is necessary to lower the hydrophilicity of a polyhydric alcohol to some extent in order to develop an interaction caused by efficiently forming a hydrogen bond between the polyhydric alcohol and a free polymer having hydroxyl groups. When the hydrophilicity of the polyhydric alcohol is high, such a polyhydric alcohol tends to reduce its proportion to form a hydrogen bond with the free polymer having hydroxyl groups because it can be completely dissolved in an aqueous medium. On the other hand, when the hydrophilicity of the polyhydric alcohol is low, such a polyhydric alcohol tends to increase its proportion to be present in the vicinity of the free polymer having hydroxyl groups, which is relatively hydrophobic, not the proportion to be dissolved in the aqueous medium. As a result, it is supposed that the hydrogen bond is easily formed between the polyhydric alcohol and the free polymer having hydroxyl groups.

In the present invention, thus, the value of number of hydroxyl groups/number of carbon atoms in its molecule (hereinafter referred to as "OH/C value") is used as an index for indicating the degree of hydrophilicity of a polyhydric alcohol. A higher OH/C value indicates that the number of hydroxyl groups in the molecule is large, or the number of carbon atoms is small, or the hydrophilicity of the polyhydric alcohol is high. On the other hand, a lower OH/C value indicates that the number of hydroxyl groups in the molecule is small, or the number of carbon atoms is large, or the hydrophilicity of the polyhydric alcohol is low.

The present inventors have found OH/C values of various polyhydric alcohols. Further, inks containing a free polymer having hydroxyl groups and only the polyhydric alcohol as a water-soluble organic solvent have been used to confirm the extent of a difference in the effect to inhibit the phenomenon that the free polymer having hydroxyl groups seeps out through the ejection orifice. As a result, it has been confirmed that the effect to inhibit the seeping out phenomenon is attained when the OH/C value of the polyhydric alcohol is 0.50 or less. From the above circumstance, the present inventors have concluded that the polyhydric alcohol contained in an ink is required to have a value of number of hydroxyl groups/number of carbon atoms in its molecule, i.e., an OH/C value, of 0.50 or less. Incidentally, in order to more effectively inhibit the seeping out phenomenon, the OH/C value of the polyhydric alcohol is preferably 0.40 or less, more preferably 0.35 or less. The OH/C value is preferably 0.10 or more.

<Ink>

The components constituting an ink according to the present invention will hereinafter be described.

(Polyhydric Alcohol Having a Value of Number of Hydroxyl Groups/Number of Carbon Atoms in its Molecule of 0.50 or Less)

It is essential for the ink according to the present invention to contain a polyhydric alcohol having a value (OH/C value) of number of hydroxyl groups/number of carbon atoms in its molecule of 0.50 or less. In the present invention, the polyhydric alcohol means a compound in which saturated carbon atoms have plural hydroxyl groups.

Examples of the polyhydric alcohol having an OH/C value of 0.50 or less include the following compounds.

1,2-butanediol, 1,3-butanediol, 1,4-butanediol, 2,3-butanediol and the like; 1,2-pentanediol, 1,3-pentanediol, 1,4-pentanediol, 1,5-pentanediol, 2,3-pentanediol, 2,4-pentanediol and the like; 1,2-hexanediol, 1,3-hexanediol, 1,4-hexanediol, 1,5-hexanediol, 1,6-hexanediol, 2,3-hexanediol, 2,4-hexanediol, 2,5-hexanediol, 3,4-hexanediol and the like; 1,2,3-hexanetriol, 1,2,4-hexanetriol, 1,2,5-hexanetriol, 1,2,6-hexanetriol, 1,3,4-hexanetriol, 1,3,5-hexanetriol, 1,3,6-hexanetriol, 2,3,4-hexanetriol, 2,3,5-hexanetriol, 3,4,5-hexanetriol and the like; 1,2-heptanediol, 1,3-heptanediol, 1,4-heptanediol, 1,5-heptanediol, 1,6-heptanediol, 1,7-heptanediol and the like; and 1,2-octanediol, 1,3-octanediol, 1,4-octanediol, 1,5-octanediol, 1,6-octanediol, 1,7-octanediol, 1,8-octanediol and the like.

Among the polyhydric alcohols having an OH/C value of 0.50 or less, those having a boiling point of 80° C. or more under ordinary pressure are particularly preferably used because they can avoid evaporation even under such an environment that water molecules evaporate from ejection orifices.

In the present invention, it is preferable to use a polyhydric alcohol that is a poor medium for the free polymer having hydroxyl groups among the polyhydric alcohols having a boiling point of 80° C. or more under ordinary pressure. When an ink contains the poor medium, the free polymer having hydroxyl groups tends to transfer from the ejection orifice to the interior of the nozzle (in the direction of the heater 2 in FIG. 1A), i.e., tends to cause a receding phenomenon. Therefore, even when the content of the polyhydric alcohol contained in the ink is low, it is possible to effectively inhibit the seeping out phenomenon of the polymer. Incidentally, the effect of the receding phenomenon can be achieved due to the hydration of the free polymer having hydroxyl groups with the polyhydric alcohol when the ink contains the polyhydric alcohol. In other words, when the ink contains no polyhydric alcohol, or when the free polymer having hydroxyl groups cannot be sufficiently hydrated with the polyhydric alcohol due to a low content of the polyhydric alcohol, the effect of the receding phenomenon may not be achieved in some cases even when the ink contains a poor medium. When a water-soluble organic solvent which is a good medium for the free polymer having hydroxyl groups, a water-soluble organic solvent which is a poor medium for the free polymer having hydroxyl groups, and/or the like is used in combination with the polyhydric alcohol, the following constitution is preferably used in order to more effectively achieve the effect of the receding phenomenon. More specifically, it is preferable to make the content of the water-soluble organic solvent which is a poor medium for the free polymer having hydroxyl groups in the ink, more than the content of the water-soluble organic solvent which is a good medium for the free polymer having hydroxyl groups.

In the present invention, a water-soluble organic solvent low in solubility to the polymer and a water-soluble organic solvent high in solubility to the polymer are defined as "poor medium" and "good medium", respectively. More specifically, the poor medium and the good medium can be determined by the following method.

To an aqueous solution of a water-soluble organic solvent diluted with water to 50 mass %, is added 0.5 g of a 10 mass % aqueous solution of a polymer to be determined dropwise, and the solution is left to stand for 4 days at room temperature in a closed state. Thereafter, the state after having been left to stand is compared with the initial state to determine the water-soluble organic solvent to be a poor medium where the solution becomes turbid, or the presence of an oily substance or deposit is observed, or to be a good medium where the solution undergoes no change.

Poor mediums and good mediums usable in the present invention include the following water-soluble organic solvents though they vary according to the kind of the polymer used. Examples of the poor mediums include alkanediols such as 1,3-propanediol, 1,5-pentanediol, 1,2-hexanediol and 1,6-hexanediol, polyethylene glycol having an average molecular weight of 600 or more, 2-pyrrolidone, and N-methyl-2-pyrrolidone. Examples of the good mediums include glycerol, diethylene glycol and 1,2,6-hexanetriol.

Incidentally, such polyhydric alcohols having a boiling point of 80° C. or more under ordinary pressure as described above may be used either singly or in any combination thereof. They may also be used in combination with other water-soluble organic solvents so far as the effect by adding them is achieved, and the objects and effects of the present invention are not impaired.

No particular limitation is imposed on the content of the polyhydric alcohols having a boiling point of 80° C. or more under ordinary pressure so far as the phenomenon that the free polymer having hydroxyl groups seeps out through the ejection orifice is inhibited. Since the polymer having hydroxyl groups used in the present invention has high hydrophilicity, it is easily desorbed from the surface of the pigment. Therefore, it is preferable to control the content of the polyhydric alcohol in such a manner that the lower limit of the total number of the hydroxyl groups of the polyhydric alcohol having an OH/C value of 0.50 or less in the ink is 100 times or more, preferably 300 times or more, as much as the total number of hydroxyl groups of the free polymer having hydroxyl groups. The upper limit is preferably 440 times or less, more preferably 330 times or less, because the effect remains unchanged if the content is further increased. The content of the polyhydric alcohol is preferably from 8 times or more to 22 times or less as much as the content of the polymer having hydroxyl groups.

(Total Number of Hydroxyl Groups of Free Polymer Having Hydroxyl Groups in Ink)

In the present invention, the total number of hydroxyl groups of the free polymer having hydroxyl groups in the ink can be measured in accordance with the following method. The present invention is not limited to the following method, and the value measured by any other method may be used.

An ink is centrifuged under conditions of 400,000 G and 16 hours, 95 mass % of a liquid in a supernatant portion is taken out. Thereafter, the resultant liquid is subjected to acid dipping to take out a free polymer. The resultant free polymer is subjected to component analysis as to monomers making up the polymer by means of $^{13}$C-NMR, gas chromatography and/or the like to calculate out the total number of hydroxyl groups of the free polymer having hydroxyl groups in the ink.

(Polymer Having Hydroxyl Groups)

It is essential for the ink according to the present invention to contain a polymer having hydroxyl groups. Polymers having hydroxyl groups include acrylic ester polymers obtained by copolymerizing acrylic ester monomers, for example, polymers obtained by copolymerizing a monomer having hydroxyl group(s) with a part of acrylic ester monomers.

Examples of the monomer having hydroxyl group(s) include 2-hydroxyethyl(meth)acrylate, hydroxypropyl(meth)acrylate, polyethylene glycol mono(meth)acrylate and polypropylene glycol mono(meth)acrylate.

As the monomer copolymerized with the monomer having hydroxyl group(s), there may be used that which are commonly used. Examples of the acrylic ester monomer include methyl(meth)acrylate, ethyl(meth)acrylate, n-butyl(meth)acrylate, 2-ethylhexyl(meth)acrylate and cyclohexyl(meth)acrylate. Besides the acrylic ester monomers, any monomer having a double bond copolymerizable with the monomer having hydroxyl group(s) may also be used. Examples thereof include a styrene monomer, vinyl acetate monomer and 1,3-butadiene.

As the polymer having hydroxyl groups, there may also be used a polymer obtained by saponifying a vinyl acetate-acrylic ester polymer obtained by copolymerizing an acrylic ester monomer and a vinyl acetate monomer with a strong base such as sodium hydroxide, i.e., a polyvinyl alcohol type polymer.

No particular limitation is imposed on the form of the polymer so far as the scratch resistance and highlighter resistance of an image as well as the ejection characteristics of the ink can be made excellent, which is the fundamental object to be achieved by the addition of the polymer having hydroxyl groups into an ink, and any polymer of linear, branched, random and block copolymers may be used. In order to inhibit a phenomenon that the polymer is desorbed from the surface of a pigment to the utmost, however, the molecular weight of the segment having hydroxyl groups is preferably 20,000 or less.

When the polymer having hydroxyl groups is a copolymer composed of a segment having hydroxyl groups and a segment having no hydroxyl group, such a polymer is preferably a block copolymer, more preferably a block copolymer in which a monomer having hydroxyl group(s) is present at a terminal of the polymer, because the adsorbability of the polymer having hydroxyl groups on the surface of the pigment is enhanced when the hydrophobic portion of the polymer having hydroxyl groups, which is adsorbed on the surface of the pigment, is concentrated on the terminal. When the ink according to the present invention is applied to an ink jet recording method in which an ink is ejected by applying thermal energy to the ink to form an image on a recording medium, the ink tends to show more stable ejection characteristics as the hydrophilicity of the polymer is higher. From this fact, it is particularly preferable to use the polyvinyl alcohol type polymer.

No particular limitation is imposed on the content (mass %) of the polymer having hydroxyl groups in the ink according to the present invention so far as the scratch resistance and highlighter resistance of an image as well as the ejection characteristics of the ink can be made excellent, which is the fundamental object. In the present invention, however, the content of the polymer having hydroxyl groups is preferably lessened to the utmost in order to lessen the content of the free polymer having hydroxyl groups, which forms the cause of the seeping out phenomenon, to the utmost. Accordingly, the content (mass %) of the polymer having hydroxyl groups in the ink is preferably from 5.0% or more to 100.0% or less, more preferably from 7.0% or more to less than 20.0% based on the total mass of the ink when the content (mass %) of the pigment in the ink is regarded as 100 based on the total mass of the ink. The content (mass %) of the polymer having hydroxyl groups is preferably less than 1.0 mass %, more preferably less than 0.8 mass % based on the total mass of the ink.

Incidentally, it has been confirmed that the effect by the poor medium as described above is not a phenomenon peculiar to an ink containing the resin dispersion pigment, and it is also effective to an ink containing a self-dispersible pigment and a polymer having hydroxyl groups as well as an ink containing a dye and a polymer having hydroxyl groups. However, as described above, the polymer having hydroxyl groups is very high in hydrophilicity. Accordingly, in order to make the scratch resistance and highlighter resistance excellent, which is the fundamental object of the present invention, it is preferable to employ an ink using as a coloring material the resin dispersion pigment, in which the polymer having hydroxyl groups is adsorbed on the pigment, not an ink into which the polymer is only added.

In the present invention, the content of the free polymer having hydroxyl groups in the ink somewhat varies according to the structure of the polymer and the pigment used together with the polymer, and the like. In this case, however, the content may be suitably controlled by ultrafiltration or the like.

(Content of Free Polymer Having Hydroxyl Groups in Ink)

In the present invention, the content of the free polymer having hydroxyl groups in the ink can be measured in accordance with the following method. The present invention is not limited to the following method, and a value measured by any other method may be used.

An ink is centrifuged under conditions of 400,000 G and 16 hours, 95 mass % of a liquid in a supernatant portion is taken out. Thereafter, the resultant liquid is subjected to acid dipping to take out a free polymer. The resultant free polymer is then dried to solid to determine the amount of the solid matter. The content of the free polymer based on the total mass of the ink is then found from the proportion to the charged amount. In this method, fine pigment particles may be contained in the liquid of the supernatant portion taken out after the centrifugation under the above-described conditions in some cases. In the present invention, however, the solid matter obtained by conducting the acid dipping by the above-described procedure is substantially regarded as solid matter of the free polymer because the amount of the pigment contained is very small. When the polymer in the ink is comprised of only the polymer having hydroxyl groups, the solid matter of this free polymer is solid matter of the free polymer having hydroxyl groups, and the content (mass %) of the free polymer having hydroxyl groups based on the total mass of the ink is found from this value.

Incidentally, the ink may contain two or more free polymers, for example, the free polymer having hydroxyl groups and a free polymer having no hydroxyl group. In such a case, it is necessary to make the following arrangement in order to determine the content of the free polymer having hydroxyl groups. Namely, the polymer having hydroxyl groups is taken out by using MALDI-TOF/MS (a combination of matrix assisted laser desorption ionization and time-of-flight mass spectrometry), arranging the acid dipping conditions or conducting GPC. The obtained polymer is subjected to component analysis as to monomers constituting the polymer by means of $^{15}C$-NMR, gas chromatography and/or the like. A 1 mass % aqueous solution of a polymer having the same structure as the polymer contained in the ink (standard sample) is prepared on the basis of this analytical result. Thereafter, an aqueous solution containing 1 mass % of the free polymer obtained above and the standard sample are subjected to infrared absorption spectrometry under the same conditions. From the result of the infrared absorption spectrometry as to the standard sample and the aqueous solution containing the free polymer, mass conversion is conducted to find the content (mass %) of the free polymer having hydroxyl groups based on the total mass of the ink.

(Pigment)

Examples of pigments usable in the inks according to the present invention include carbon black and organic pigments. The content (mass %) of the pigment is preferably from 0.1 mass % to 10.0 mass % based on the total mass of the ink.

[Carbon Black]

Examples of usable carbon black include carbon black pigments such as furnace black, lamp black, acetylene black and channel black. It goes without saying that carbon black pigments are not limited to the following pigments.

As specific examples thereof, there may be mentioned Raven: 1170, 1190 ULTRA-II, 1200, 1255, 1500, 2000, 3500, 5000, 5250, 5750 and 7000 (all, products of Columbian Carbon Japan Limited); Black Pearls L, Regal: 330R, 400R and 660R, Mogul L, Monarch: 700, 800, 880, 900, 1000, 1100, 1300 and 1400, and Valcan XC-72R (all, products of CABOT CO.); Color Black: FW1, FW2, FW2V, FW18, FW200, S150, S160 and S170, Printex: 35, U, V, 140U and 140V, and Special Black: 4, 4A, 5 and 6 (all, products of Degussa AG); and No. 25, No. 33, No. 40, No. 47, No. 52, No. 900, No. 2300, MCF-88, MA7, MA8, MA100 and MA600 (all, products of MITSUBISHI CHEMICAL CORPORATION).

Besides the above pigments, any carbon black conventionally known may be used. Magnetic fine particles such as magnetite and ferrite, titanium black, and the like may also be used as black pigments.

[Organic Pigment]

The organic pigments specifically include the following pigments, such as insoluble azo pigments such as Toluidine Red, Toluidine Maroon, Hansa Yellow, Benzidine Yellow and Pyrazolone Red; soluble azo pigments such as Lithol Red, Helio Bordeaux, Pigment Scarlet and Permanent Red 2B; derivatives from vat dyes, such as alizarin, indanthron and Thioindigo Maroon; phthalocyanine pigments such as Phthalocyanine Blue and Phthalocyanine Green; quinacridone pigments such as Quinacridone Red and Quinacridone Magenta; perylene pigments such as Perylene Red and Perylene Scarlet; isoindolinone pigments such as Isoindolinone Yellow and Isoindolinone Orange; imidazolone pigments such as Benzimidazolone Yellow, Benzimidazolone Orange and Benzimidazolone Red; pyranthrone pigments such as Pyranthrone Red and Pyranthrone Orange; indigo pigments; condensed azo pigments; thioindigo pigments; Flavanthrone Yellow; Acylamide Yellow; Quinophthalone Yellow; Nickel Azo Yellow; Copper Azomethine Yellow; Perinone Orange; Anthrone Orange; Dianthraquinonyl Red; Dioxazine Violet; etc.

When organic pigments are indicated by COLOR INDEX (C.I.) numbers, the following pigments may be exemplified. It goes without saying that conventionally known organic pigments may also be used in addition to the following pigments.

C.I. Pigment Yellow: 12, 13, 14, 17, 20, 24, 74, 83, 86, 93, 109, 110, 117, 120, 125, 128, 137, 138, 147, 148, 151, 153, 154, 166 and 168; C.I. Pigment Orange: 16, 36, 43, 51, 55, 59 and 61; C.I. Pigment Red: 9, 48, 49, 52, 53, 57, 97, 122, 123, 149, 168, 175, 176, 177, 180, 192, 215, 216, 217, 220, 223, 224, 226, 227, 228, 238 and 240; C.I. Pigment Violet: 19, 23, 29, 30, 37, 40 and 50; C.I. Pigment Blue: 15, 15:3, 15:1, 15:4, 15:6, 22, 60 and 64; C.I. Pigment Green: 7 and 36; and C.I. Pigment Brown 23, 25 and 26.

(Dispersant)

In the inks according to the present invention, it is essential to use the polymer having hydroxyl groups as a dispersant in consideration of scratch resistance, highlighter resistance and ejection characteristics. Further, any other polymer may be used as a dispersant in the inks according to the present invention so far as the effect by adding them is achieved, and the objects and effects of the present invention are not impaired.

As another dispersant, there is preferably used that capable of stably dispersing the pigment in an aqueous medium by an action of an anionic group. For example, the following dispersants may be used.

Specific examples thereof include styrene-acrylic acid copolymers, styrene-acrylic acid-alkyl acrylate terpolymers and salts thereof; styrene-maleic acid copolymers, styrene-maleic acid-alkyl acrylate terpolymers and salts thereof; styrene-methacrylic acid copolymers, styrene-methacrylic acid-alkyl acrylate terpolymers and salts thereof; styrene-maleic acid half ester copolymers, vinylnaphthalene-acrylic acid copolymers, vinylnaphthalene-maleic acid copolymers, styrene-maleic anhydride-maleic acid half ester terpolymers and salts thereof.

The dispersant used in the present invention preferably has a weight average molecular weight ranging from 1,000 or more to 30,000 or less, more preferably from 3,000 or more to 15,000 or less, particularly preferably from 5,000 or more to 14,000 or less, most preferably from 8,000 or more to 12,000 or less.

(Aqueous Medium)

In the inks according to the present invention, an aqueous medium, which is water, or a mixed solvent of water and any of various water-soluble organic solvents, may be used.

In the present invention, it is at least essential that the water-soluble organic solvent is a polyhydric alcohol having a value of number of hydroxyl groups/number of carbon atoms in its molecule of 0.50 or less. However, other water-soluble organic solvents may also be used in combination so far as the effect by adding them is achieved, and the objects and effects of the present invention are not impaired. When the polyhydric alcohol having an OH/C value of 0.50 or less and another water-soluble organic solvent are used in combination, the following constitution is preferably used when another water-soluble organic solvent is a good medium for the polymer having hydroxyl groups. More specifically, the content of the water-soluble organic solvent, which is a good medium for the polymer having hydroxyl groups, is preferably made less than the content of the polyhydric alcohol.

No particular limitation is imposed on the water-soluble organic solvent so far as it is soluble in water, and the following solvents may be used.

Monohydric alkyl alcohols having 1 to 4 carbon atoms, such as ethyl alcohol, n-propyl alcohol, isopropyl alcohol, n-butyl alcohol, sec-butyl alcohol and tert-butyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; alkylene glycols the alkylene group of which has 2 to 6 carbon atoms, such as ethylene glycol, propylene glycol, butylene glycol, triethylene glycol and thiodiglycol; lower alkyl ether acetates such as polyethylene glycol monomethyl ether acetate; bishydroxyethyl sulfone; lower alkyl glycol ethers such as ethylene glycol monomethyl (or ethyl, butyl) ether, diethylene glycol monomethyl (or ethyl, butyl) ether and triethylene glycol monomethyl (or ethyl, butyl) ether; lower dialkyl glycol ethers such as triethylene glycol dimethyl (or ethyl) ether and tetraethylene glycol dimethyl (or ethyl) ether; alkanolamines such as monoethanolamine, diethanolamine and triethanolamine; sulfolane; N-methyl-2-pyrrolidone; 2-pyrrolidone; 1,3-dimethyl-2-imidazolidinone; and polyhydric alcohols having an OH/C value more than 0.50, such as 1,2-ethanediol(ethylene glycol), 1,2-propanediol, 1,3-propanediol, 1,2,3-propanetriol (glycerol), 1,2,3-butanetriol, 1,2,4-butanetriol, 1,2,3-pentanetriol, 1,2,4-pentanetriol, 1,2,5-pentanetriol, 1,3,4-pentanetriol, 1,3,5-pentanetriol, 1,2,3,4-pentanetetraol, 1,2,3,5-pentanetetraol and 1,2,3,4,5-pentanepentaol.

In the present invention, it is particularly preferable that the ink contains polyethylene glycol having an average molecular weight of from 600 or more to 1,500 or less, since ejection characteristics, particularly, ejection characteristics when the ink is continuously ejected, can be made excellent. In particular, the content of polyethylene glycol having an average molecular weight of from 600 or more to 1,500 or lees is preferably 0.5 times or more as much as the content of the pigment (solid content) in the ink.

The content (mass %) of the water-soluble organic solvents including the polyhydric alcohol having a value of number of hydroxyl groups/number of carbon atoms in its molecule of 0.50 or less is preferably from 3.0 mass % or more to 50.0 mass % or less, more preferably from 7.0 mass % or more to 50.0 mass % or less based on the total mass of the ink.

As the water, it is preferable to use deionized water (ion-exchanged water). The content (mass %) of water is preferably from 40.0 mass % or more to 95.0 mass % or less based on the total mass of the ink.

(Other Additives)

Besides the above components, a surfactant, an antifoaming agent, a preservative, a mildewproofing agent and the like may be added to the inks used in the present invention, not to mention the addition of a humectant, as needed, to obtain an ink having desired physical properties.

When the resin dispersion pigment is used as a coloring material like the present invention, however, the surfactant tends to be adsorbed on the surface of the pigment. Therefore, when a polymer high in hydrophilicity and easy to be desorbed from the surface of the pigment like the polymer having hydroxyl groups is used as a dispersant, it is preferable to lessen the content of the surfactant in the ink to the utmost. Specifically, the content (mass %) of the surfactant in the ink is preferably 25% or less, more preferably 12.5% or less, when the content (mass %) of the pigment (solid content) in the ink is regarded as 100.

<Ink Jet Recording Method, Ink Cartridge, Recording Unit and Ink Jet Recording Apparatus>

Figure 3:
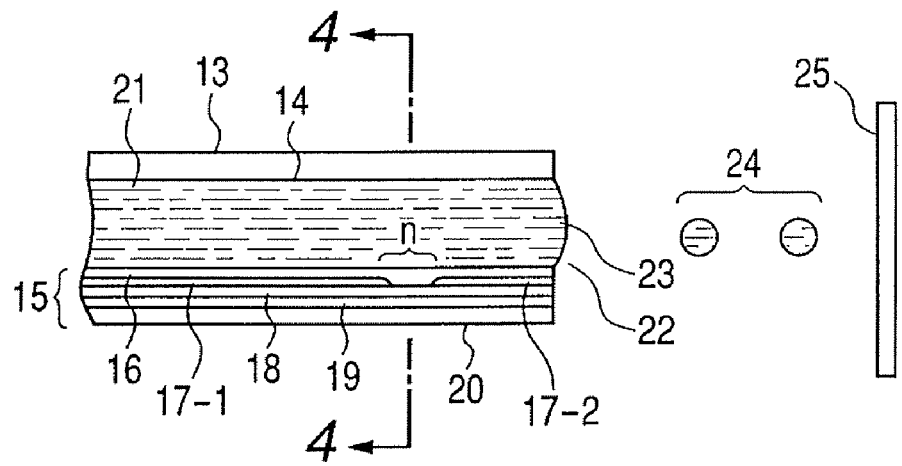
FIG. 3 is a longitudinal cross-sectional view illustrating a recording head.
Figure 4:
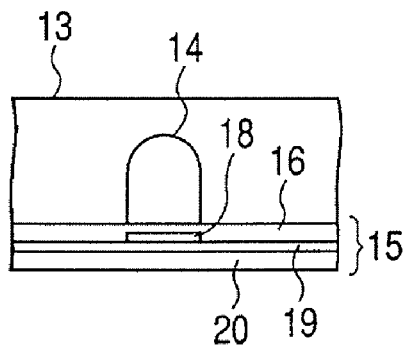
FIG. 4 is a transverse cross-sectional view of the recording head.

An exemplary ink jet recording apparatus will hereinafter be described. First of all, an exemplary construction of a recording head, which is a main component of the ink jet recording apparatus making good use of thermal energy is shown in FIG. 3 and FIG. 4. FIG. 3 is a cross-sectional view of a recording head 13 taken along the flow path of ink, and FIG. 4 is a cross-sectional view taken along line 4-4 in FIG. 3. The recording head 13 is formed by a member having a flow path (nozzle) 14, through which an ink is passed, and a heating element substrate 15. The heating element substrate 15 is composed of a protective layer 16, electrodes 17-1 and 17-2, a heating resistor layer 18, a heat accumulating layer 19 and a substrate 20.

When pulsed electric signals are applied to the electrodes 17-1 and 17-2 of the recording head 13, the heating element substrate 15 rapidly generates heat at the region shown by 'n' to form bubbles in an ink 21 which is in contact with this region. A meniscus 23 of the ink is projected by the pressure of the bubbles, and the ink 21 in the form of droplets 24 is ejected from an ejection orifice 22 through the nozzle 14 toward a recording medium 25.

Figure 5:
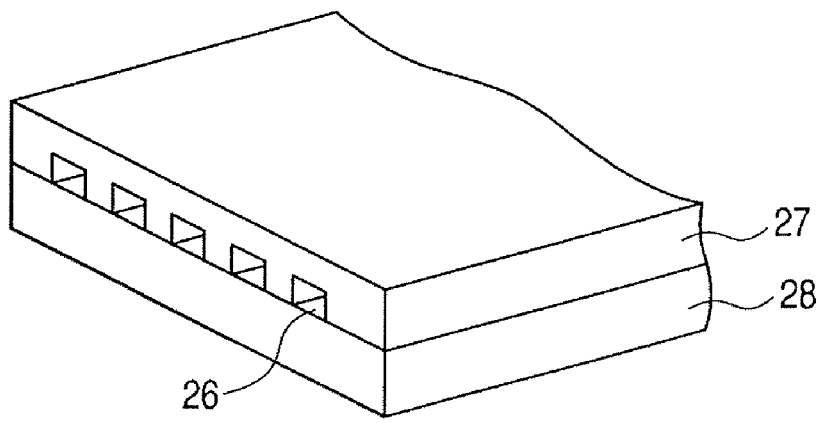
FIG. 5 is a perspective view of a multi-head composed of an array of a number of recording heads as shown in FIG. 3.

FIG. 5 illustrates an appearance of a multi-head composed of an array of a number of heads as shown in FIG. 3. The multi-head is composed of a glass plate 27 having a number of nozzles 26 and a recording head 28 similar to that described in FIG. 3.

Figure 6:
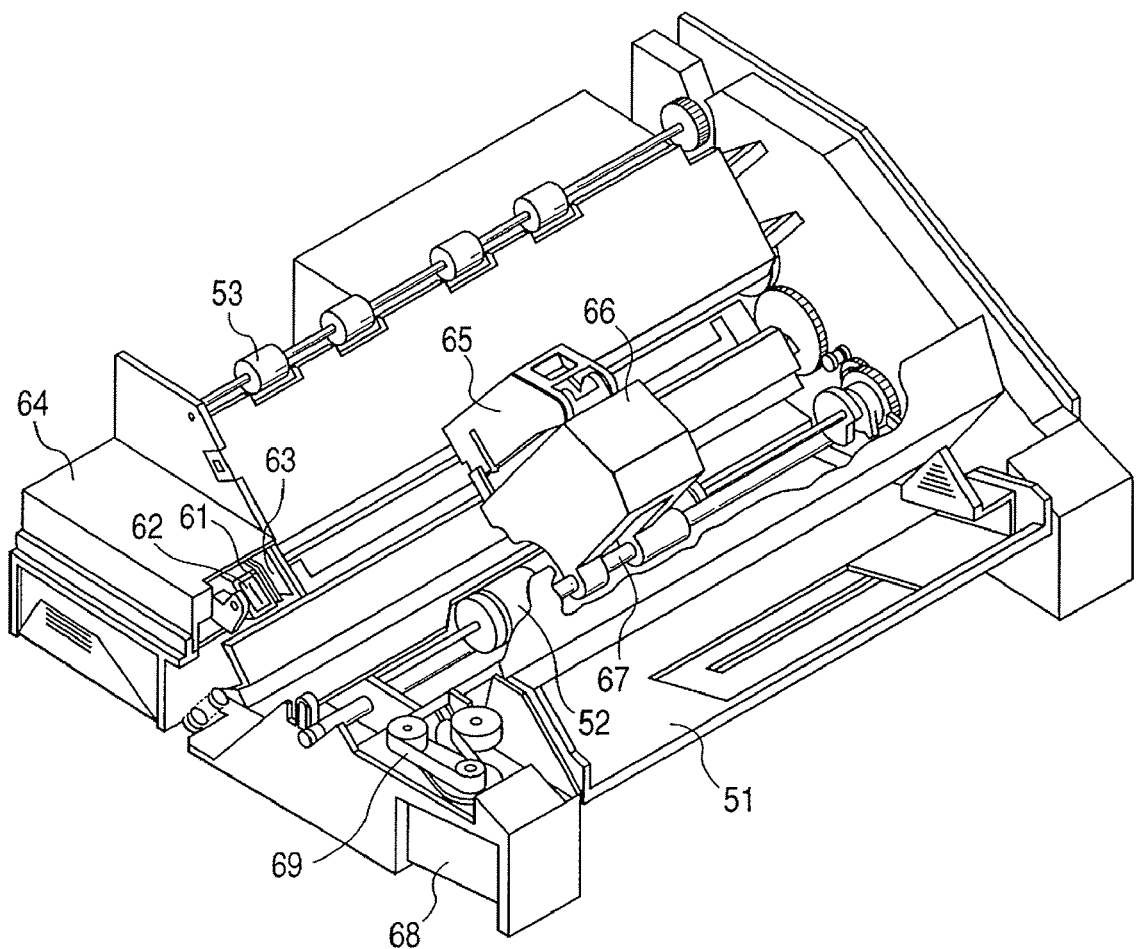
FIG. 6 is a perspective view illustrating an exemplary ink jet recording apparatus.

FIG. 6 is a perspective view illustrating an exemplary ink jet recording apparatus in which a recording head has been incorporated. A blade 61 is a wiping member, one end of which is a stationary end held by a blade-holding member to form a cantilever. The blade 61 is arranged at a position adjacent to a region, in which a recording head 65 operates, and is held in a form protruding into the course through which the recording head 65 is moved.

Reference numeral 62 indicates a cap for the face of ejection orifices of the recording head 65, which is provided at a home position adjacent to the blade 61, and is so constructed that it moves in a direction perpendicular to a direction in which the recording head 65 is moved, and comes into contact with the face of the ejection orifices to cap it. Reference numeral 63 denotes an ink absorbing member provided adjoiningly to the blade 61 and, similar to the blade 61, held in a form protruding into the course through which the recording head 65 is moved. An ejection-recovery portion 64 is constructed by the blade 61, cap 62 and ink absorbing member 63. Water, dust and/or the like are removed from the face of the ink-ejecting orifices by the blade 61 and ink absorbing member 63.

Reference numeral 65 designates the recording head having an ejection-energy-generating means and serving to eject the ink on to a recording medium set in an opposing relation to the ejection orifice face provided with the ejection orifices to conduct recording. Reference numeral 66 indicates a carriage on which the recording head 65 is mounted so that the recording head 65 can be moved. The carriage 66 is slidably interlocked with a guide shaft 67 and is connected (not illustrated) at its part to a belt 69 driven by a motor 68. Thus, the carriage 66 can be moved along the guide shaft 67 and hence, the recording head 65 can be moved from a recording region to a region adjacent thereto.

Reference numerals 51 and 52 denote a feeding part from which the recording medium is inserted, and feed rollers driven by a motor (not illustrated), respectively. With such a construction, the recording medium is fed to the position opposite to the ejection orifice face of the recording head 65, and discharged from a discharge section provided with discharge rollers 53 with the progress of recording. The cap 62 in the ejection-recovery portion 64 is receded from the path of motion of the recording head 65 when the recording head 65 is returned to its home position after completion of recording by the recording head 65, and the blade 61 remains protruded into the path of motion. As a result, the ejection orifice face of the recording head 65 is wiped.

When the cap 62 comes into contact with the ejection orifice face of the recording head 65 to cap it, the cap 62 is moved so as to protrude into the path of motion of the recording head 65. When the recording head 65 is moved from its home position to the position at which recording is started, the cap 62 and blade 61 are at the same positions as the positions for the wiping as described above. As a result, the ejection orifice face of the recording head 65 is also wiped at the time of this movement. The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection orifice face is wiped in accordance with this movement.

Figure 7:
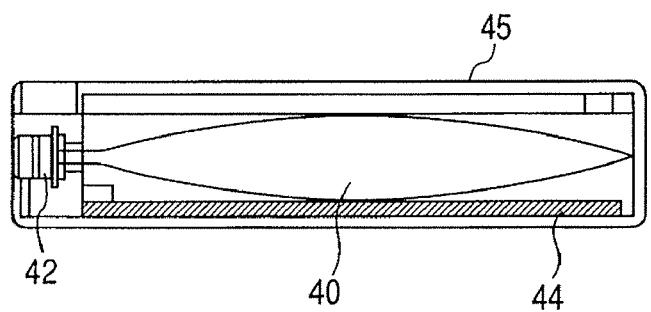
FIG. 7 is a longitudinal cross-sectional view illustrating an ink cartridge.

FIG. 7 illustrates an exemplary ink cartridge in which an ink to be fed to a recording head through an ink-feeding member, for example, a tube is stored. Here, reference numeral 40 designates an ink storage portion storing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the recording head. Reference numeral 44 indicates an absorbing member for receiving a waste ink.

Figure 8:
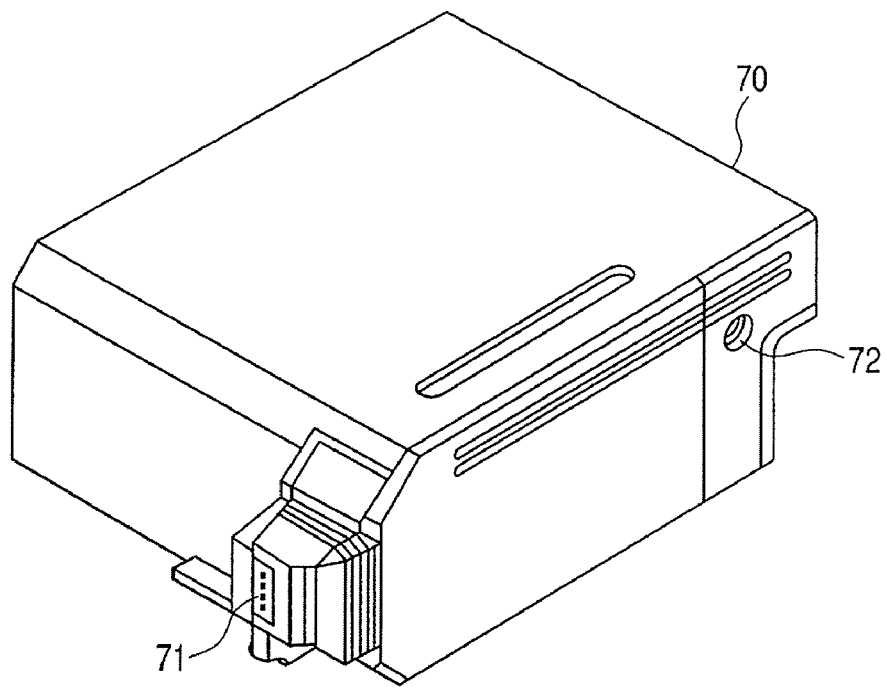
FIG. 8 is a perspective view illustrating an exemplary recording unit.

The ink jet recording apparatus are not limited to the apparatus in which the recording head and the ink cartridge are separately provided. Therefore, an apparatus in which these members are integrally formed as shown in FIG. 8 may also be preferably used. In FIG. 8, reference numeral 70 designates a recording unit, in the interior of which an ink storage portion storing an ink, for example, an ink absorbing member, is contained, and the ink in the ink absorbing member is ejected in the form of ink droplets through a recording head 71 having a plurality of ejection orifices. The ink storage portion may be constructed by a bag for the ink, in the interior of which a spring or the like is provided, without using the ink absorbing member. Reference numeral 72 indicates an air passage for communicating the interior of the recording unit 70 with the atmosphere. This recording unit 70 is used in place of the recording head 65 shown in FIG. 6, and is detachably installed on the carriage 66.

Figure 9:
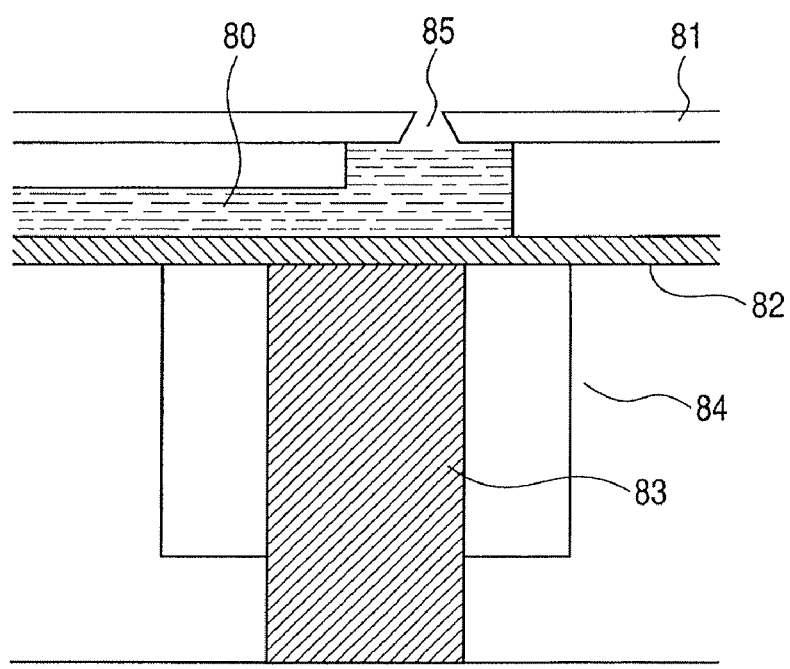
FIG. 9 typically illustrates the construction of an exemplary recording head.

An ink jet recording apparatus making good use of mechanical energy will now be described. The apparatus is equipped with a nozzle-forming substrate having a plurality of nozzles, pressure-generating devices composed of a piezoelectric material and an electric conductive material, and an ink filled around the pressure-generating devices and features a recording head in which the pressure-generating devices are changed by applying a voltage to eject droplets of the ink from ejection orifices. FIG. 9 typically illustrates an example of the construction of the recording head. The recording head is constructed by an ink flow path 80 communicating with an ink chamber, an orifice plate 81, a vibration plate 82 for applying a pressure to the ink, a piezoelectric element 83 bonded to the vibration plate 82 undergoing a change according to an electric signal, and a substrate 84 adapted to support and fix the orifice plate 81, the vibration plate 82 and the like thereon. The vibration plate 82 bonded to the piezoelectric element 83 is deformed by strain stress generated by applying a pulsed voltage to the piezoelectric element 83 to pressurize the ink in the ink flow path 80, thereby ejecting ink droplets from the ejection orifice 85 of the orifice plate 81. Such a recording head can be used by incorporating it into an ink jet recording apparatus similar to that illustrated in FIG. 6.

EXAMPLES

The present invention will hereinafter be described more specifically by the following Examples and Comparative Examples. However, the present invention is not limited by these examples so far as the subject matter of the present invention is not overstepped. Incidentally, all designations of "part" or "parts" and "%" as will be used in the following examples mean part or parts by mass and mass % unless expressly noted.

<Preparation of Pigment Dispersion Solution>

In the preparation of the following pigment dispersion solutions, the following carbon black and polymers were used. However, the present invention is not limited thereto.

Carbon black: one having a specific surface area of 210 $m^2/g$ and a DBP oil absorption of 74 ml/100 g.

Polymer A: a polymer obtained by saponifying and neutralizing polyvinyl acetate-b-poly(styrene-co-acrylic acid) (compositional (molar) ratio: 20:60:20) having a weight average molecular weight of 8,000 with a 10 mass % aqueous solution of potassium hydroxide.

Polymer B: a polymer obtained by neutralizing poly(benzyl methacrylate-co-acrylic acid) (compositional (molar) ratio: 70:30) having a weight average molecular weight of 12,000 with a 10 mass % aqueous solution of potassium hydroxide.

Polymer C: a polymer obtained by neutralizing poly(2-hydroxyethyl methacrylate)-b-poly(styrene-co-acrylic acid) (compositional (molar) ratio: 20:60:20) having a weight average molecular weight of 8,000 with a 10 mass % aqueous solution of potassium hydroxide.

Polymer D: a polymer obtained by saponifying and neutralizing poly(vinyl acetate-co-styrene-co-acrylic acid) (compositional (molar) ratio: 20:60:20) having a weight average molecular weight of 8,000 with a 10 mass % aqueous solution of potassium hydroxide.

(Preparation of Black Pigment Dispersion Solution 1)

Ten parts of carbon black, 2 parts of Polymer A and 88 parts of ion-exchanged water were mixed and dispersed for 3 hours by means of a batch type vertical sand mill. The resultant liquid dispersion was centrifuged, thereby removing coarse particles, and then filtered under pressure through a microfilter (product of Fuji Photo Film Co., Ltd.) having a pore size of 3.0 µm, thereby preparing Resin Dispersion Black Pigment 1. Water was added to Resin Dispersion Black Pigment 1 to disperse the pigment so as to give a pigment concentration of 10 mass %, thereby preparing a liquid dispersion to obtain Black Pigment Dispersion Solution 1 in accordance with the above-described process. The resultant Black Pigment Dispersion Solution 1 was subjected to ultrafiltration to adjust the content of the free polymer having hydroxyl groups. The mass ratio (pigment:Polymer A) of the content of the pigment to the content of Polymer A in Black Pigment Dispersion Solution 1 was 100:18.

(Preparation of Black Pigment Dispersion Liquid 2)

Ten parts of carbon black, 2 parts of Polymer A, 2 parts of Polymer B and 86 parts of ion-exchanged water were mixed and dispersed for 3 hours by means of a batch type vertical sand mill. The resultant liquid dispersion was centrifuged, thereby removing coarse particles, and then filtered under pressure through a microfilter (product of Fuji Photo Film Co., Ltd.) having a pore size of 3.0 µm, thereby preparing Resin Dispersion Black Pigment 2. Water was added to Resin Dispersion Black Pigment 2 to disperse the pigment so as to give a pigment concentration of 10 mass %, thereby preparing a liquid dispersion to obtain Black Pigment Dispersion Solution 2 in accordance with the above-described process. The resultant Black Pigment Dispersion Solution 2 was subjected to ultrafiltration to adjust the content of the free polymer having hydroxyl groups. In order to find the mass ratio of the content of the pigment to the content of Polymer A in Black Pigment Dispersion Solution 2, the following process was performed. After Black Pigment Dispersion Solution 2 obtained above was dried to solid, the solid was dissolved in tetrahydrofuran to obtain a solution. Thereafter, the resultant solution was filtered under pressure through a microfilter (product of Fuji Photo Film Co., Ltd.) having a pore size of 3.0 µm to separate the solution into the pigment and a solution containing the polymers. The solution containing the polymers was subjected to GPC (gel permeation chromatography) to separately take out Polymer A and Polymer B. The mass ratio (pigment:Polymer A) of the content of the pigment to the content of Polymer A in Black Pigment Dispersion Solution 2 was 100:16.

(Preparation of Black Pigment Dispersion Solution 3)

Ten parts of carbon black, 2 parts of Polymer A and 88 parts of ion-exchanged water were mixed and dispersed for 3 hours by means of a batch type vertical sand mill. The resultant dispersion liquid was centrifuged, thereby removing coarse particles, and then filtered under pressure through a microfilter (product of Fuji Photo Film Co., Ltd.) having a pore size of 3.0 µm, thereby preparing Resin Dispersion Black Pigment 3. Water was added to Resin Dispersion Black Pigment 3 to disperse the pigment so as to give a pigment concentration of 10 mass %, thereby preparing a liquid dispersion to obtain Black Pigment Dispersion Solution 3 in accordance with the above-described process. The resultant Black Pigment Dispersion Solution 3 was subjected to ultrafiltration to adjust the content of the free polymer having hydroxyl groups. The mass ratio (pigment:Polymer A) of the content of the pigment to the content of Polymer A in Black Pigment Dispersion Liquid 3 was 100:16.

(Preparation of Black Pigment Dispersion Solution 4)

Ten parts of carbon black, 3 parts of Polymer A and 87 parts of ion-exchanged water were mixed and dispersed for 3 hours by means of a batch type vertical sand mill. The resultant dispersion liquid was centrifuged, thereby removing coarse particles, and then filtered under pressure through a microfilter (product of Fuji Photo Film Co., Ltd.) having a pore size of 3.0 µm, thereby preparing Resin Dispersion Black Pigment 4. Water was added to Resin Dispersion Black Pigment 4 to disperse the pigment so as to give a pigment concentration of 10 mass %, thereby preparing a liquid dispersion to obtain Black Pigment Dispersion Solution 4 in accordance with the above-described process. The resultant Black Pigment Dispersion Solution 4 was subjected to ultrafiltration under the same conditions as in Black Pigment Dispersion Solution 1 to adjust the content of the free polymer having hydroxyl groups. The mass ratio (pigment:Polymer A) of the content of the pigment to the content of Polymer A in Black Pigment Dispersion Liquid 4 was 100:20.

(Preparation of Black Pigment Dispersion Solution 5)

Ten parts of carbon black, 2 parts of Polymer C and 88 parts of ion-exchanged water were mixed and dispersed for 3 hours by means of a batch type vertical sand mill. The resultant dispersion liquid was centrifuged, thereby removing coarse particles, and then filtered under pressure through a microfilter (product of Fuji Photo Film Co., Ltd.) having a pore size of 3.0 µm, thereby preparing Resin Dispersion Black Pigment 5. Water was added to Resin Dispersion Black Pigment 5 to disperse the pigment so as to give a pigment concentration of 10 mass %, thereby preparing a liquid dispersion to obtain Black Pigment Dispersion Solution 5 in accordance with the above-described process. The resultant Black Pigment Dispersion Solution 5 was subjected to ultrafiltration to adjust the content of the free polymer having hydroxyl groups. The mass ratio (pigment:Polymer C) of the content of the pigment to the content of Polymer C in Black Pigment Dispersion Solution 5 was 100:19.

(Preparation of Black Pigment Dispersion Solution 6)

Ten parts of carbon black, 2 parts of Polymer D and 88 parts of ion-exchanged water were mixed and dispersed for 3 hours by means of a batch type vertical sand mill. The resultant dispersion liquid was centrifuged, thereby removing coarse particles, and then filtered under pressure through a microfilter (product of Fuji Photo Film Co., Ltd.) having a pore size of 3.0 µm, thereby preparing Resin Dispersion Black Pigment 6. Water was added to Resin Dispersion Black Pigment 6 to disperse the pigment so as to give a pigment concentration of 10 mass %, thereby preparing a liquid dispersion to obtain Black Pigment Dispersion Solution 6 in accordance with the above-described process. The resultant Black Pigment Dispersion Solution 6 was subjected to ultrafiltration under the same conditions as in Black Pigment Dispersion Solution 1 to adjust the content of the free polymer having hydroxyl groups. The mass ratio (pigment:Polymer D) of the content of the pigment to the content of Polymer D in Black Pigment Dispersion Liquid 6 was 100:18.

<Preparation of Ink>

After the components shown in the following Table 1 and Table 2 were mixed and sufficiently stirred, the resultant respective mixtures were filtered under pressure through a microfilter (product of Fuji Photo Film Co., Ltd.) having a pore size of 1.0 µm, thereby preparing Inks 1 to 18.

<Quantitative Determination of Free Polymer and Free Polymer Having Hydroxyl Groups>

The content (mass %) of the free polymer and the content (mass %) of the free polymer having hydroxyl groups in each ink were determined in accordance with the following method. The results are shown in Table 1 and Table 2.

The ink was centrifuged under conditions of 400,000 G and 16 hours, 95 mass % of a liquid in the supernatant portion was taken out. Thereafter, the resultant liquid was subjected to acid dipping to take out the free polymer. The resultant free polymer was dried to solids, and the amount of the solid was determined. The content of the free polymer based on the total mass of the ink was then found from the proportion to the charged amount.

Incidentally, with respect to Ink 2 containing 2 polymers in the ink, the content of the free polymer having hydroxyl groups in the ink was determined by performing the following process in addition to the above-described procedure. Namely, the structure of Polymer A was determined by a method known per se in the art, and a 1 mass % aqueous solution of Polymer A (standard sample) was prepared. Thereafter, an aqueous solution containing 1 mass % of the free polymer obtained above and the standard sample were subjected to infrared absorption spectrometry under the same conditions. From the result of the infrared absorption spectrometry as to the standard sample and the aqueous solution containing the free polymer, mass conversion was conducted to find the content (mass %) of the free polymer having hydroxyl groups based on the total mass of the ink.

TABLE 1

| | | Ink 1 | Ink 2 | Ink 3 | Ink 4 | Ink 5 | Ink 6 | Ink 7 | Ink 8 | Ink 9 |
|---|---|---|---|---|---|---|---|---|---|---|
| Coloring material | Black Pigment Dispersion Solution 1 | 40.0 | | | 40.0 | 40.0 | 40.0 | 40.0 | 40.0 | 40.0 |
| | Black Pigment Dispersion Solution 2 | | 40.0 | | | | | | | |
| | Black Pigment Dispersion Solution 3 | | | 40.0 | | | | | | |
| | Black Pigment Dispersion Solution 4 | | | | | | | | | |
| | Black Pigment Dispersion Solution 5 | | | | | | | | | |
| | Black Pigment Dispersion Solution 6 | | | | | | | | | |
| Water-soluble organic solvent | 1,2-Hexanediol | | | | 6.0 | | | | | |
| | 1,6-Hexanediol | | | | | 6.0 | | | | |
| | 1,5-Pentanediol | | | | | | 6.0 | | | 6.0 |
| | 1,2,6-Hexanetriol | 14.0 | 14.0 | 14.0 | | | | 10.0 | 14.0 | |
| | Glycerol | | | | | | | | | |
| | 1,3-Propanediol | | | | | | | | | |
| | Diethylene glycol | | | | | | | | | 5.0 |
| | Polyethylene glycol (*1) | 2.0 | 2.0 | 2.0 | 2.0 | 2.0 | 2.0 | 2.0 | | 2.0 |
| Surfactant | Acetylenol EH (*2) | 0.1 | 0.1 | 0.1 | 0.1 | 0.1 | 0.1 | 0.1 | 0.1 | 0.1 |
| Ion-exchanged water | | 43.9 | 43.9 | 43.9 | 51.9 | 51.9 | 51.9 | 47.9 | 45.9 | 46.9 |
| Total number of hydroxyl groups in polyhydric alcohol [×10$^{-3}$ mol/100 g] | | 310 | 310 | 310 | 100 | 100 | 120 | 220 | 310 | 120 |
| Total number of hydroxyl groups in free polymer having hydroxyl groups [×10$^{-4}$ mol/100 g] | | 9.4 | 11.7 | 7.0 | 9.4 | 9.4 | 9.4 | 9.4 | 9.4 | 9.4 |
| Content of poor medium to free polymer having hydroxyl groups [mass %] | | 2.0 | 2.0 | 2.0 | 8.0 | 8.0 | 8.0 | 2.0 | 0.0 | 8.0 |
| Content of good medium to free polymer having hydroxyl groups [mass %] | | 14.0 | 14.0 | 14.0 | 0.0 | 0.0 | 0.0 | 10.0 | 14.0 | 5.0 |
| Content of pigment [mass %] | | 4.0 | 4.0 | 4.0 | 4.0 | 4.0 | 4.0 | 4.0 | 4.0 | 4.0 |
| Content of polymer having hydroxyl groups [mass %] | | 0.72 | 0.64 | 0.64 | 0.72 | 0.72 | 0.72 | 0.72 | 0.72 | 0.72 |
| Content of free polymer having hydroxyl groups [mass %] | | 0.40 | 0.50 | 0.30 | 0.40 | 0.40 | 0.40 | 0.40 | 0.40 | 0.40 |
| Content of free polymer [mass %] | | 0.40 | 0.70 | 0.30 | 0.40 | 0.40 | 0.40 | 0.40 | 0.40 | 0.40 |
| Content of polyhydric alcohol [mass %] | | 14.0 | 14.0 | 14.0 | 6.0 | 6.0 | 6.0 | 10.0 | 14.0 | 6.0 |
| Content of water-soluble organic solvent [mass %] | | 16.0 | 16.0 | 16.0 | 8.0 | 8.0 | 8.0 | 12.0 | 14.0 | 13.0 |
| Total number of hydroxyl groups in polyhydric alcohol/Total number of hydroxyl groups in free polymer having hydroxyl groups | | 330 | 265 | 443 | 106 | 106 | 128 | 234 | 330 | 128 |
| Content of pigment/Content of polymer having hydroxyl groups | | 19.4 | 21.9 | 21.9 | 8.3 | 8.3 | 8.3 | 13.9 | 19.4 | 8.3 |
| Content of polymer having hydroxyl groups/Content of pigment [%] | | 18.0 | 16.0 | 16.0 | 18.0 | 18.0 | 18.0 | 18.0 | 18.0 | 18.0 |

In Table 1, Polyhydric alcohol means a polyhydric alcohol having an OH/C value of 0.50 or less.
(*1) Average molecular weight: 1,000.
(*2) Acetylene glycol ethylene oxide adduct (product of Kawaken Fine Chemicals Co., Ltd.).

In Table 1, Polyhydric alcohol means a polyhydric alcohol having an OH/C value of 0.50 or less.

(*1) Average molecular weight: 1,000.

(*2) Acetylene glycol ethylene oxide adduct (product of Kawaken Fine Chemicals Co., Ltd.).

TABLE 2

| | | Ink | | | | | | | | |
|---|---|---|---|---|---|---|---|---|---|---|
| | | 10 | 11 | 12 | 13 | 14 | 15 | 16 | 17 | 18 |
| Coloring material | Black Pigment Dispersion Solution 1 | 40.0 | | 40.0 | | | 40.0 | 40.0 | 40.0 | 40.0 |
| | Black Pigment Dispersion Solution 2 | | | | | | | | | |
| | Black Pigment Dispersion Solution 3 | | | | | | | | | |
| | Black Pigment Dispersion Solution 4 | | 40.0 | | | | | | | |
| | Black Pigment Dispersion Solution 5 | | | | 40.0 | | | | | |
| | Black Pigment Dispersion Solution 6 | | | | | 40.0 | | | | |
| Water-soluble organic solvent | 1,2-Hexanediol | 4.0 | | | | | | | | |
| | 1,6-Hexanediol | | | | | | | | | |
| | 1,5-Pentanediol | | | 6.0 | | | | | | |
| | 1,2,6-Hexanetriol | | 14.0 | | 14.0 | 14.0 | | | | |
| | Glycerol | | | | | | | 14.0 | | |
| | 1,3-Propanediol | | | | | | 10.0 | | | |
| | Diethylene glycol | | | 7.0 | | | | | 14.0 | |
| | Polyethylene glycol (*1) | 2.0 | 2.0 | | | 2.0 | 2.0 | 2.0 | 2.0 | 14.0 |
| Surfactant | Acetylenol EH (*2) | 0.1 | 0.1 | 0.1 | 0.1 | 0.1 | 0.1 | 0.1 | 0.1 | 0.1 |
| Ion-exchanged water | | 53.9 | 43.9 | 46.9 | 47.9 | 43.9 | 43.9 | 45.9 | 43.9 | 45.9 |
| Total number of hydroxyl groups in polyhydric alcohol [×10$^{-3}$ mol/100 g] | | 70 | 310 | 120 | 310 | 310 | 0 | 0 | 0 | 0 |
| Total number of hydroxyl groups in free polymer having hydroxyl groups [×10$^{-4}$ mol/100 g] | | 9.4 | 11.7 | 9.4 | 7.4 | 9.9 | 9.4 | 9.4 | 9.4 | 9.4 |
| Content of poor medium to free polymer having hydroxyl groups [mass %] | | 6.0 | 2.0 | 6.0 | 0.0 | 2.0 | 12.0 | 2.0 | 2.0 | 14.0 |
| Content of good medium to free polymer having hydroxyl groups [mass %] | | 0.0 | 14.0 | 7.0 | 14.0 | 14.0 | 0.0 | 14.0 | 14.0 | 0.0 |
| Content of pigment [mass %] | | 4.0 | 4.0 | 4.0 | 4.0 | 4.0 | 4.0 | 4.0 | 4.0 | 4.0 |
| Content of polymer having hydroxyl groups [mass %] | | 0.72 | 0.80 | 0.72 | 0.76 | 0.72 | 0.72 | 0.72 | 0.72 | 0.72 |
| Content of free polymer having hydroxyl groups [mass %] | | 0.40 | 0.50 | 0.40 | 0.38 | 0.42 | 0.40 | 0.40 | 0.40 | 0.40 |
| Content of free polymer [mass %] | | 0.40 | 0.50 | 0.40 | 0.38 | 0.42 | 0.40 | 0.40 | 0.40 | 0.40 |
| Content of polyhydric alcohol [mass %] | | 4.0 | 14.0 | 6.0 | 14.0 | 14.0 | 0.0 | 0.0 | 0.0 | 0.0 |
| Content of water-soluble organic solvent [mass %] | | 6.0 | 16.0 | 13.0 | 14.0 | 16.0 | 12.0 | 16.0 | 16.0 | 14.0 |
| Total number of hydroxyl groups in polyhydric alcohol/Total number of hydroxyl groups in free polymer having hydroxyl groups | | 74 | 265 | 128 | 419 | 313 | 0 | 0 | 0 | 0 |
| Content of pigment/Content of polymer having hydroxyl groups | | 5.6 | 17.5 | 8.3 | 18.4 | 19.4 | 0.0 | 0.0 | 0.0 | 0.0 |
| Content of polymer having hydroxyl groups/Content of pigment [%] | | 18.0 | 20.0 | 18.0 | 19.0 | 18.0 | 18.0 | 18.0 | 18.0 | 18.0 |

In Table 1, Polyhydric alcohol means a polyhydric alcohol having an OH/C value of 0.50 or less.

(*1) Average molecular weight: 1,000.

(*2) Acetylene glycol ethylene oxide adduct (product of Kawaken Fine Chemicals Co., Ltd.).

In Table 2, Polyhydric alcohol means a polyhydric alcohol having an OH/C value of 0.50 or less.

(*1) Average molecular weight: 1,000.

(*2) Acetylene glycol ethylene oxide adduct (product of Kawaken Fine Chemicals Co., Ltd.).

<Determination of Poor Medium or Good Medium>

With respect to the respective water-soluble organic solvents used in the preparation of the inks, whether they were a poor medium or a good medium was determined. To an aqueous solution of each water-soluble organic solvent diluted with ion-exchanged water to 50 mass %, was added 0.5 g of a 10 mass % aqueous solution of Polymer A, Polymer C or Polymer D dropwise, and the solution was left to stand for 4 days at room temperature in a closed state. Thereafter, the state after left to stand was compared with the initial state to determine the water-soluble organic solvent to be a poor medium when the solution became turbid or the presence of an oily substance or deposit was observed, or to be a good medium when the solution underwent no change. The results are shown in Table 3. Incidentally, in Table 3, a poor medium was indicated by "Yes", and a good medium was indicated by "No"

<Calculation of OH/C Value of Water-Soluble Organic Solvent>

With respect to the respective water-soluble organic solvents used in the preparation of the inks, the value (OH/C value) of number of hydroxyl groups/number of carbon atoms in the molecule was calculated. The results are shown in Table 3. Incidentally, with respect to polyethylene glycol (average molecular weight: 1,000), the OH/C value cannot be calculated out because it has a molecular weight distribution.

TABLE 3

|  | Determination result of poor medium or good medium | | | |
|---|---|---|---|---|
|  | Polymer A | Polymer C | Polymer D | OH/C value |
| 1,2-Hexanediol | Yes | Yes | Yes | 0.33 |
| 1,6-Hexanediol | Yes | Yes | Yes | 0.33 |
| 1,5-Pentanediol | Yes | Yes | Yes | 0.40 |
| 1,2,6-Hexanetriol | No | No | No | 0.50 |
| Glycerol | No | No | No | 1.00 |
| 1,3-Propanediol | Yes | Yes | Yes | 0.67 |
| Diethylene glycol | No | No | No | 0.50 |
| Polyethylene glycol (*1) | Yes | Yes | Yes | — |

(*1) Average molecular weight: 1,000.

<Evaluation>

(Seeping Out Phenomenon)

Each of the inks obtained above was stored into an ink cartridge, and the ink cartridge was installed at the position of the cyan ink of a modified ink jet recording apparatus "PIXUS 860i" (manufactured by Canon Inc.). After a head cleaning operation was then conducted twice to confirm that the ink has reached an ejection orifice, the main power of the ink jet recording apparatus was turned off. After the ink jet recording apparatus was left to stand for 2 weeks at room temperature in this state, the recording head was taken out of the apparatus body without turning on the main power while the ink cartridge was kept installed, and the condition in the vicinity of the ejection orifices (nozzles) was observed through a microscope. The recording head was then installed again in the ink jet recording apparatus, the main power was turned on, and the head cleaning operation was conducted once. Thereafter, a nozzle check pattern was recorded. The ink was evaluated as to the seeping out phenomenon by the condition of the nozzles and the nozzle check pattern. The evaluation criteria of the seeping out phenomenon were as follows. The results of the evaluation are shown in Table 4.

[Evaluation Criteria of Seeping Out Phenomenon]

A: No seeping out phenomenon was observed on all nozzles, and recording failure was not recognized on the nozzle check pattern.

B: The seeping out phenomenon was observed on less than 1% of all nozzles, but recording failure was not recognized on the nozzle check pattern.

C: The seeping out phenomenon was observed on 1% or more and less than 5% of all nozzles, and recording failure was recognized on the nozzle check pattern in some of the nozzles.

D: The seeping out phenomenon was observed on 5% or more of all nozzles, and recording failure was recognized on the nozzle check pattern.

TABLE 4

|  |  | Ink | Seeping out phenomenon |
|---|---|---|---|
| Example | 1 | 1 | A |
|  | 2 | 2 | A |
|  | 3 | 3 | A |
|  | 4 | 4 | A |
|  | 5 | 5 | A |
|  | 6 | 6 | A |
|  | 1 | 7 | B |
|  | 8 | 8 | A |
|  | 9 | 9 | A |
|  | 10 | 10 | B |
|  | 11 | 11 | A |
|  | 12 | 12 | A |

TABLE 4-continued

|  |  | Ink | Seeping out phenomenon |
|---|---|---|---|
|  | 13 | 13 | A |
|  | 14 | 14 | A |
| Comparative Example | 1 | 15 | C |
|  | 2 | 16 | C |
|  | 3 | 17 | C |
|  | 4 | 18 | C |

With respect to the inks of Examples 1 to 6, 8, 9 and 11 to 14, the evaluation results of which were ranked as A, the evaluation as to the seeping out phenomenon was made repeatedly 5 times in accordance with the same procedure as described above. As a result, in the inks according to Examples 11 and 12, ranking as B with the evaluation criteria occurred twice. Accordingly, the inks according to Examples 11 and 12 were somewhat low in the effect to inhibit the seeping out phenomenon compared with the inks according to Examples 1 to 6, 8, 9, 13 and 14.

(Scratch Resistance)

Each of the Inks 1 to 3, 8 and 13 obtained above was stored into an ink cartridge, and the ink cartridge was installed at the position of the black ink of a modified ink jet recording apparatus "PIXUS 860i" (manufactured by Canon Inc.). Thereafter, a solid print portion of 2 cm×2 cm and characters were recorded on a recording medium (PB Paper, product of Canon Inc.) to prepare a recorded matter. Incidentally, the ejection quantity per dot of the ink was within 30 ng±10%.

For the printer driver a default mode was selected.

Kind of paper: plain paper.

Print quality: standard.

Color adjustment: automatic.

After the recorded matter obtained above was left to stand for one minute at room temperature, the recorded portion was rubbed with a finger to visually observe the degree of stain of the solid printed portion, the characters and the finger, thereby evaluating the ink as to the scratch resistance. The criteria of the scratch resistance were as follows. The results of the evaluation are shown in Table 5.

[Evaluation Criteria of Scratch Resistance]

A: Scraping of the recorded portions is scarcely conspicuous at both solid-printed area and character-printed area, and no finger was soiled.

B: The solid-printed area or character-printed area is scraped off, and the finger was also soiled.

(Highlighter Resistance)

Each of Inks 1 to 3, 8 and 13 obtained above was stored into an ink cartridge, and the ink cartridge was installed at the position of the black ink of a modified ink jet recording apparatus "PIXUS 860i" (manufactured by Canon Inc.). Thereafter, a solid print portion of 2 cm×2 cm and characters were recorded on a recording medium (PB Paper, product of Canon Inc.) to prepare a recorded matter. Incidentally, the ejection quantity per dot of the ink was within 30 ng±10%.

For the printer driver a default mode was selected.

Kind of paper: plain paper.

Print quality: standard.

Color adjustment: automatic.

After the recorded matter obtained above was left to stand for one hour at room temperature, the character-printed area was marked once under an ordinary writing pressure with a yellow highlighter (Spot Writer, product of Pilot Pen Co., Ltd.), whereby the degree of stain of the recorded matter and the pen point was visually observed to evaluate the ink as to the highlighter resistance. The criteria of the highlighter resistance were as follows. The results of the evaluation are shown in Table 5.

[Evaluation Criteria of Highlighter Resistance]

A: Neither blurring of the recorded portions nor stain of white portions is observed, and the pen point is also not soiled.

B: No stain was observed on the white portions in the recorded matter, but the pen point is slightly soiled.

C: Stain was observed on the white portions in the recorded matter.

(Ejection Characteristics)

Each of Inks 1 to 3, 8 and 13 obtained above was stored into an ink cartridge, and the ink cartridge was installed at the position of the black ink of a modified ink jet recording apparatus "PIXUS 860i" (manufactured by Canon Inc.). Thereafter, a solid print portion having a recording density of 100% in a size of 2 cm×8 cm was recorded on a recording medium (PB Paper, product of Canon Inc.) with a drive frequency varied from 100 Hz to 1 kHz, 5 kHz, 10 kHz and 15 kHz to prepare a recorded matter. Incidentally, the ejection quantity per dot of the ink was within 30 ng±10%.

For the printer driver a default mode was selected.

Kind of paper: plain paper.

Print quality: standard.

Color adjustment: automatic.

The image densities and condition of unevenness of the solid printed images in the recorded matter obtained above, and the condition of ejection failure upon the recording were visually observed to evaluate the ink as to the ejection characteristics. The criteria of the ejection characteristics were as follows. The results of the evaluation are shown in Table 5.

[Evaluation Criteria of Ejection Characteristics]

A: No ejection failure occurs up to 15 kHz, and solid printed images obtained by recording at 15 kHz and 100 Hz are comparable in image density and unevenness when compared with each other.

B: No ejection failure occurs up to 15 kHz, but the solid printed image at 15 kHz is poorer in image density and condition of unevenness when compared with the solid printed image at 100 Hz.

C: No ejection failure occurs up to 10 kHz, but the solid printed image at 15 kHz undergoes unevenness due to the presence of nozzles of ejection failure and occurrence of dot misalignment

TABLE 5

|  |  | Ink | Scratch resistance | Highlighter resistance | Ejection characteristics |
|---|---|---|---|---|---|
| Example | 15 | 1 | A | A | A |
|  | 16 | 2 | A | A | A |
|  | 17 | 3 | A | A | A |
|  | 18 | 8 | A | A | B |
|  | 19 | 13 | A | A | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-314708, filed Oct. 28, 2005, which is hereby incorporated by reference herein in its entirety.

What is claimed is:

1. A method of inhibiting a seeping out phenomenon of a polymer from an ejection orifice of an ink jet recording head, the method comprising:

using an aqueous ink comprising (1) a polymer having hydroxyl groups, (2) a pigment, and (3) an aqueous medium which is a mixed solvent of water and at least one water-soluble organic solvent, wherein the water-soluble organic solvent comprises a polyhydric alcohol having a value of number of hydroxyl groups/number of carbon atoms in its molecule of 0.40 or less, wherein the polymer having hydroxyl groups is a polyvinyl alcohol type polymer that is a copolymer with a segment having hydroxyl groups and a segment having no hydroxyl group, wherein the pigment is dispersed in the aqueous medium by the polymer having hydroxyl groups, and wherein the ink after two weeks at room temperature in an ink cartridge, the ink cartridge communicating with an ink jet recording head having a plurality of nozzles, exhibits seeping out phenomenon on less than 1% of the plurality of nozzles of the ink jet recording head.

2. The method of inhibiting a seeping out phenomenon of a polymer according to claim 1, wherein a total number of hydroxyl groups of the polyhydric alcohol having a value of number of hydroxyl groups/number of carbon atoms in its molecule of 0.40 or less in the ink is 100 times or more as much as a total number of hydroxyl groups of a polymer that is not adsorbed on the pigment out of the polymer having hydroxyl groups.

3. The method of inhibiting a seeping out phenomenon of a polymer according to claim 1, wherein the polymer having hydroxyl groups is a block copolymer.

4. The method of inhibiting a seeping out phenomenon of a polymer according to claim 1, wherein a weight average molecular weight of the polymer having hydroxyl groups ranges from 8,000 to 12,000.

5. The method of inhibiting a seeping out phenomenon of a polymer according to claim 1, wherein the polyhydric alcohol has the value of number of hydroxyl groups/number of carbon atoms of 0.10 or more.

6. The method of inhibiting a seeping out phenomenon of a polymer according to claim 1, wherein a content (mass %) of the polymer having hydroxyl groups based on the total mass of the aqueous ink is from 5.0% or more to 100.0% or less when a content (mass %) of the pigment based on the total mass of the aqueous ink is regarded as 100.

7. The method of inhibiting a seeping out phenomenon of a polymer according to claim 1, wherein the content (mass %) of the polymer having hydroxyl groups based on the total mass of the aqueous ink is from 7.0% or more to less than 20.0% when the content (mass %) of the pigment based on the total mass of the aqueous ink is regarded as 100.

8. The method of inhibiting a seeping out phenomenon of a polymer according to claim 1, wherein the segment having hydroxyl groups is present at a terminal of the polymer having hydroxyl groups.

9. The method of inhibiting a seeping out phenomenon of a polymer according to claim 1, wherein the aqueous ink further comprises a water-soluble organic solvent that is a good medium for the polymer having hydroxyl groups, and the content of the good medium is less than the content of the polyhydric alcohol.

10. The method of inhibiting a seeping out phenomenon of a polymer according to claim 1, wherein the aqueous ink further comprises polyethylene glycol having an average molecular weight of from 600 or more to 1,500 or less and the content of the polyethylene glycol is 0.5 times or more as much as the content of the pigment in the ink.

11. The method of inhibiting a seeping out phenomenon of a polymer according to claim 1, wherein the aqueous ink further comprises a surfactant and the content (mass %) of the surfactant in the ink is 12.5% or less when the content (mass %) of the pigment (solid content) in the ink is regarded as 100.

12. The method of inhibiting a seeping out phenomenon of a polymer according to claim 1, wherein the content (mass %) of the polymer having hydroxyl groups is less than 0.8 mass % based on the total mass of the ink.

13. The method of inhibiting a seeping out phenomenon of a polymer according to claim 1, wherein the polyhydric alcohol having a value of number of hydroxyl groups/number of carbon atoms in its molecule of 0.40 or less is 1,2-hexanediol.

14. The method of inhibiting a seeping out phenomenon of a polymer according to claim 1, wherein the content of the water soluble organic solvent comprising a polyhydric alcohol having a value of number of hydroxyl groups/number of carbon atoms in its molecule of 0.40 or less is 7.0 mass % or more and 50.0 mass % or less based on the total mass of the ink.

15. The method of inhibiting a seeping out phenomenon of a polymer according to claim 1, wherein the content of the pigment in the ink is from 0.1 mass % to 10.0 mass % based on the total mass of the ink.

16. The method of inhibiting a seeping out phenomenon of a polymer according to claim 1, wherein the polyhydric alcohol having a value of number of hydroxyl groups/number of carbon atoms in its molecule of 0.40 or less is 1,6-hexanediol.

17. The method of inhibiting a seeping out phenomenon of a polymer according to claim 1, wherein the polyhydric alcohol having a value of number of hydroxyl groups/number of carbon atoms in its molecule of 0.40 or less is 1,5-pentanediol.

18. The method of inhibiting a seeping out phenomenon of a polymer according to claim 1, wherein the aqueous ink comprises both a water-soluble organic solvent that is a good medium and a water-soluble organic solvent that is a poor medium for a polymer that is not adsorbed on the pigment out of the polymer having hydroxyl groups, and wherein the content (mass %) of the poor medium is more than the content (mass %) of the good medium.

19. The method of inhibiting a seeping out phenomenon of a polymer according to claim 1, wherein the segment having hydroxyl groups comprises a polyvinyl alcohol unit, and wherein the segment having no hydroxyl group comprises a unit derived from at least one monomer selected from the group consisting of styrene, benzyl methacrylate, and acrylic acid.

20. The method of inhibiting a seeping out phenomenon of a polymer according to claim 1, wherein the content (mass %) of the polymer having hydroxyl groups is less than 0.8 mass % based on the total mass of the ink,
   wherein the content of the water-soluble organic solvent comprising a polyhydric alcohol having a value of number of hydroxyl groups/number of carbon atoms in its molecule of 0.40 or less is 7.0 mass % or more and 50.0 mass % or less based on the total mass of the ink, and
   wherein the content of the pigment in the ink is from 0.1 mass % to 10.0 mass % based on the total mass of the ink.

21. The method of inhibiting a seeping out phenomenon of a polymer according to claim 20, wherein a content (mass %) of the polymer having hydroxyl groups based on the total mass of the aqueous ink is from 5.0% or more to 100.0% or less when a content (mass %) of the pigment based on the total mass of the aqueous ink is regarded as 100.

22. The method of inhibiting a seeping out phenomenon of a polymer according to claim 1, wherein the content of the polyhydric alcohol having a value of number of hydroxyl groups/number of carbon atoms in its molecule of 0.40 or less is from 8 times or more to 22 times or less as much as the content of the polymer having hydroxyl groups.

23. The method of inhibiting a seeping out phenomenon of a polymer according to claim 22, wherein a content (mass %) of the polymer having hydroxyl groups based on the total mass of the aqueous ink is from 5.0% or more to 100.0% or less when a content (mass %) of the pigment based on the total mass of the aqueous ink is regarded as 100, and wherein the content of the pigment in the ink is from 0.1 mass % to 10.0 mass % based on the total mass of the ink.

* * * * *